United States Patent
Lau et al.

(10) Patent No.: US 7,622,413 B2
(45) Date of Patent: Nov. 24, 2009

(54) MULTIFUNCTIONAL ADDITIVE FOR MAXIMIZING PROPERTIES RELEVANT TO THE PROCESS OF FLUID CATALYTIC CRACKING AND THE PROCESS FOR PREPARATION THEREOF

(75) Inventors: Lam Yiu Lau, Rio de Janeiro (BR); Eliane Bernad Castro Mattos, Rio de Janeiro (BR); João Eduardo Cerutti Karam, Rio de Janeiro (BR); Ricardo Drolhe Montaury Pimenta, Rio de Janeiro (BR); Rodolfo Eugênio Roncolatto, Niteroi (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 359 days.

(21) Appl. No.: 11/497,262

(22) Filed: Aug. 2, 2006

(65) Prior Publication Data
US 2007/0032374 A1   Feb. 8, 2007

(30) Foreign Application Priority Data
Aug. 4, 2005   (BR) ................................. 0503182

(51) Int. Cl.
*B01J 29/06* (2006.01)
(52) U.S. Cl. .............................. 502/60; 502/63; 502/64; 502/65; 502/68; 502/69; 502/73; 502/77
(58) Field of Classification Search .................... 502/60, 502/63, 64, 65, 68, 69, 73, 77
See application file for complete search history.

(56) References Cited

U.S. PATENT DOCUMENTS

| | | | |
|---|---|---|---|
| 3,972,832 A | 8/1976 | Butter et al. | |
| 4,356,338 A | 10/1982 | Young | |
| 4,456,780 A | 6/1984 | Young | |
| 4,889,615 A | 12/1989 | Chin et al. | |
| 5,071,807 A | 12/1991 | Kennedy et al. | |
| 5,380,690 A * | 1/1995 | Zhicheng et al. | 502/65 |
| 5,456,821 A * | 10/1995 | Absil et al. | 208/114 |
| 6,858,556 B2 * | 2/2005 | Kuvettu et al. | 502/67 |

FOREIGN PATENT DOCUMENTS

EP   0 554 968   2/1993

* cited by examiner

*Primary Examiner*—Elizabeth D Wood
(74) *Attorney, Agent, or Firm*—Nixon & Vanderhye P.C.

(57) ABSTRACT

A multifunctional additive for maximizing yield of light olefins and LPG, with a tolerance to contaminant metals. Maximization of the referenced properties is accomplished through the use of a zeolite treated with a phosphorus source, calcined and impregnated with a rare earth salt. The process for preparation of the referenced catalyst includes the following steps: preparation of a precursor containing a zeolite that is selective of olefins with a source of phosphorus; placement of a source of phosphorus in this precursor through calcination; deposition of rare earth salts on the surface of the additive for maximizing the yield of light olefins and LPG that forms; and drying the multifunctional additive formed.

15 Claims, No Drawings

MULTIFUNCTIONAL ADDITIVE FOR MAXIMIZING PROPERTIES RELEVANT TO THE PROCESS OF FLUID CATALYTIC CRACKING AND THE PROCESS FOR PREPARATION THEREOF

CROSS REFERENCE TO RELATED APPLICATION

This application is based upon, claims the benefit of, priority of, and incorporates by reference, the contents of Brazilian Patent Application No. PI 0503182-6 filed Aug. 4, 2005.

FIELD OF THE INVENTION

The application field of this invention is found among the additives for maximizing the properties relevant to fluid catalytic cracking (FCC) and the process for preparation of these. Specifically, within multifunctional additives, in other words, those capable of simultaneously maximizing a plurality of properties relevant to the FCC process and the preparatory processes of these. More specifically, within multifunctional additives that are capable of maximizing vanadium tolerance and of producing light olefins and liquefied petroleum gas (LPG) in fluid catalytic cracking, and the preparatory process of these.

DESCRIPTION OF THE STATE OF THE ART

Fluid catalytic cracking (FCC) process is one of the technologies of major strategic importance in the petroleum refining industry. Through said technology, hydrocarbons of low molecular weight are produced, which are used by the final consumer as well as by the petrochemical industry.

The mounting increase in demand has led to the manipulation of relevant variables in the process so as to increase performance of the products involved. However, it is well known that such manipulations are effective only up to a certain limit. This limit has been reached and overtaken by the growing demand in a short period of time. In this way, other solutions were developed so that the industry might meet the needs of the growing demand.

Currently, in order to obtain better yield from the FCC units, the worldwide trend has been to process high molecular-weight hydrocarbon streams and to maximized selectivity for light olefins and liquefied petroleum gas (LPG). These types of streams possess high levels of contaminant metals, such as vanadium and nickel, which attack active catalyst components. Therefore, an additive to maximize light olefins and LPGs is used in conjunction with other additives that maximize the tolerance to contaminant metals.

In the majority of cases, the results obtained are not synergic, with one additive jeopardizing the performance of the other. Furthermore, diluting the catalyst bed leads to a decline in the conversion, not to mention an increase in operational costs caused by using two additives.

In fact, an analysis of the state of the art shows that there are patents of various additives to maximize light olefins and LPG and also for various additives to maximize the tolerance to contaminant metals. However, such protection for a single additive that is capable of providing both functions does not exist.

Regarding maximization of the performance of LPG and light olefins, this effect may be obtained through changes in the FCC processing conditions or through catalytic systems. So, by increasing the reaction temperature, or the catalyst/stream ratio, for example, LPG and light olefin yield increases. However, the increase obtained by manipulating the above mentioned variables may be accompanied by an undesirable increase in the yield of combustible gas.

Regarding catalytic systems, using zeolite ZSM-5 in the formulations of catalysts or in separate particles is well known in the state of the art. Separate particles are usually applied in small proportions and is known in the field as "olefin additive". Due to greater flexibility of application and to a more favorable distribution of the products concerned, the use of olefin additives is practiced with greater frequency.

Pure ZSM-5 zeolite possesses lower selectivity for olefins. To use in a FCC process, the referenced zeolite is stabilized with a source of phosphorus, as described in the American patents, U.S. Pat. No. 3,972,832, U.S. Pat. No. 4,356,338 and U.S. Pat. No. 4,456,780.

The formulation of olefin additives, besides containing a zeolite as a binder, such as for example, silica-alumina, also contain a species of phosphorus.

Several chemical compounds are capable of capturing and neutralizing mobile species of contaminant metals, specifically vanadium. In this way, the attack on active components of the catalysts is avoided. These compounds are known in the state of the art as "metal traps".

American patent U.S. Pat. No. 5,071,807, protects a metal trap made of a mixture of alkaline earth metal oxides, such as for example, dolomite and sepiolite. In the same way, American patent U.S. Pat. No. 4,889,615 protects a metal trap made of hydrotalcite.

A metal trap may contain components like rare earths, strontium, titanium, etc., that have a tendency to form stable compounds with types of vanadium, like several types of vanadates. European patent EP 0 554 968 protects a metal trap made from aluminum, lanthanum and magnesium oxides co-precipitated in order to passivate the vanadium.

Compounds that work as metal traps may be incorporated within the catalyst's own particles, or in separate particles as additives.

The use of an additive containing a component to maximize olefins together with a component that is usually used as a metal trap does not necessarily imply that the newly created particle will also possess the properties described as optimized. It is known that alkaline materials that make up metal traps may neutralize the zeolite acid sites, reducing its activity and/or the light olefin yield. On the other hand, the phosphorus source may also interact with metal traps, creating a phosphate and reducing the ability to passivate the contaminant metals. Therefore, in addition to increasing processing costs, the joint use of two additives tends to produce results that are not very satisfactory.

In this way, it is desirable to obtain a production process with an additive capable of possessing the property of maximizing the yield of light olefins and LPG, as well as having a tolerance to contaminant metals. In this way, production costs are reduced and the yield of the products of interest will be increased.

SUMMARY OF THE INVENTION

A multifunctional additive for the maximization of properties relevant to the fluid catalytic cracking process, which is the object of this invention, designed to maximize the yield of light olefins and LPG, with a tolerance to contaminant metals and to minimize costs associated with including two additives to the reaction system, through the use of a zeolite treated with a phosphorus source, calcined and impregnated with a rare earth salt.

The process for preparation of the referenced catalyst includes the following steps:

preparation of a precursor containing a zeolite that is selective of olefins with a source of phosphorus;

placement of a source of phosphorus in this precursor through calcination;

deposition of rare earth salts on the surface of the additive for maximizing the yield of light olefins and LPG that forms; and drying the multifunctional additive formed.

DETAILED DESCRIPTION OF THE INVENTION

The detailed description of the multifunctional additive to maximize the properties relevant to fluid catalytic cracking and the process of preparing same, which is the object of this invention, shall be made in accordance with the steps of the referenced process.

This invention deals with a multifunctional additive for the maximization of properties relevant to the fluid catalytic cracking process and the process for its preparation designed to maximize the yield of light olefins and LPG, with a tolerance to contaminant metals and to minimize costs associated with including two additives to the reaction system Generally, the additive for maximizing light olefins contains, among other substances, zeolite ZSM-5 and a source of phosphorus. The zeolite mentioned is a component that is quite selective for the formation of light olefins in an FCC process. The multifunctional additive is produced from treating a precursor that contains, among other components, zeolite ZSM-5 and a source of phosphorus with rare earth salts. The rare earth salts capture and passivate the contaminant metals such as, for example, vanadium. The process of preparation and optimization so that the structure of the additive is made accessible is accomplished not only by using organic compounds but also through inorganic compounds of vanadium, which facilitates capture of these. Moreover, the rare earth salts and the phosphorus species do not interfere with the function of the zeolite in the production of light olefins.

The precursor is prepared by adding a mixture of:

a peptized alumina created through treatment with nitric acid;

a clay;

commercial colloidal silica or synthesized silica;

a zeolite ZSM-5; and phosphoric acid.

After the addition phase of the mixture, drying takes place with a "spray dryer" in such a way that the additive acquires particle size and is in a micro-sphere format.

Once it is this way, the prepared micro-spheres have the properties of an additive for the maximization of light olefins. From these properly prepared micro-spheres, the process for preparation of the referenced multifunctional additive includes the following steps:

placement of the phosphorus source in an additive to maximize the yield of light olefins and LPG. This step is designed to avoid excessive interaction of the phosphorus species with the components to be deposited on the surface of the additive in the following steps. The referenced placement is made through calcination at a temperature in the range of between 350° C. and 750° C., preferably in the range of between 450° C. and 500° C., during a period of between 0.5 and 5 hours, preferably between 2 and 4 hours;

deposition of rare earth salts on the surface of the additive for maximizing the yield of light olefins and LPG. A solution containing rare earth salts, that may be selected from: rare earth chlorides, rare earth nitrates or mixtures of these which are diluted in deionized water until the total volume of the solution is equal to the pore volume of the prepared microspheres. The percentage in weight of the rare earth salts in relation to the multifunctional additive is between 0.5% and 20%, preferably between 1% and 10%, and better yet between 2% and 6%; and drying of the multifunctional additive create should be at a temperature in the range of between 60° C. and 120° C., preferably in the range of between 100° C. and 120° C., during a period of between 1 and 24 hours, preferably between 4 and 16 hours.

In this way, the multifunctional additive, created from an additive to maximize light olefins is prepared by the steps of placing the phosphorus source, depositing the rare earth salts and drying. Thus, the referenced multifunctional additive possesses characteristics that maximize the yield of light olefins and tolerance to contaminant metals in an FCC process.

As an alternative to the placement step for the phosphorus source through calcination, the placement may be accomplished by washing with warm deionized water, at a temperature of between 60° C. and 100° C. with moderate agitation for a period of between 0.5 and 5 hours.

Alternatively, the step of depositing the rare earths may be accomplished by adding a solution of ammonium hydroxide, at a concentration of between 1 and 8 mols, preferably between 2 and 6 mols, and then added. Consequently, the pH of the solution falls within a range of between 7 and 11, preferably between 8 and 10. As a result, the rare earth salts are deposited through hydrolysis.

EXAMPLES

The following examples illustrate each step of the preparatory process of the multifunctional additive to maximize the relevant properties, the performance of the referenced additive as well as the additive to maximize olefins and to act as a metal trap.

Example 1

The purpose of this example is to determine some properties of the multifunctional additive prepared by the process disclosed in this patent. Moreover, said example also demonstrates the efficiency of an alternative step to place the phosphorus species in a preparatory process for the multifunctional additive.

In a preliminary step, phosphoric acid is blended into kaolin. Next, zeolite ZSM-5 crystals, colloidal silica and peptized alumina are added. The viscous suspension formed is then dried by atomization in a "spray dryer", creating microspheres. Several types of micro-spheres were produced and the percentages by weight of the components and a few of the properties are summarized in Table 1.

TABLE 1

| Samples | A | B | C | D |
|---|---|---|---|---|
| $Al_2O_3$ (% p/p) | 24.3 | 39.5 | 32.4 | 28.7 |
| $Na_2O$ (% p/p) | 0.19 | 0.58 | 0.43 | 0.46 |
| $SiO_2$ (% p/p) | 60.6 | 49.1 | 56.4 | 59.5 |
| $P_2O_5$ (% p/p) | 14.1 | 9.82 | 9.80 | 10.3 |

TABLE 1-continued

| Samples | A | B | C | D |
|---|---|---|---|---|
| MiPV 3-5 (ml/g) | 0.022 | 0.003 | 0.024 | 0.023 |
| MSA 3-5 (m$^2$/g) | 17.8 | 14.4 | 20.5 | 16.3 |
| SA (m$^2$/g) | 65.4 | 22 | 72 | 65 |
| Average Size of Particle (μm) | 70 | 70 | 70 | 70 |

Then, the placement step for the species of phosphorus is done. This step is designed to avoid excessive interaction of the phosphorus species with the rest of the components to be deposited on the micro-spheres of the additive in the subsequent steps. In this way, the proper placement of the phosphorus helps to optimize both the maximization of the tolerance to contaminant metals and the yield of light olefins and LPG.

Part of samples B, C, and D was suspended in deionized water at a temperature of 100° C., while being moderately agitated to avoid sedimentation, for a period of 1 hour.

After this period of time, the suspension was filtered and washed with water at ambient temperature (25° C.).

For the purpose of evaluating the efficiency of a calcination step as an alternative to the procedure described above, another portion of samples B, C, and D was calcined at a temperature of 600° C., during a period of 1 hour.

After calcinating the samples, they were washed with warm water at a temperature of 100° C. for 1 hour and an analysis of the wash water was performed for the purpose of evaluating the amount of phosphorus present. The data related to this experiment are found in Table 2.

TABLE 2

| Samples | B | C | D |
|---|---|---|---|
| Analysis of the Solids | | | |
| P$_2$O$_5$ before washing (%) | 9.8 | 9.8 | 10.3 |
| P$_2$O$_5$ after washing (%) | 9.8 | 9.8 | 10.9 |
| Prospective Loss (analysis of the wash water) | | | |
| P$_2$O$_5$ (%) | 0.005 | 0.012 | 0.024 |

Table 2 shows that, after calcination, washing with warm water does not remove a significant amount of phosphorus, indicating that the phosphorus is properly fixed on the catalyst particle.

Then, the step for the deposit of rare earth salts is executed. A certain amount of rare earth chlorides was dissolved in 19.2 ml of deionized water creating a solution that was slowly dripped into 40 g of sample A with constant homogenization. Said quantity of rare earth chloride was calculated so as to obtain a concentration of RE$_2$O$_3$ of approximately 2.5% w/w in the multifunctional additive. The total volume of this solution was calculated so as to be the same as the total volume of pores in the prepared micro-spheres.

After depositing the rare earth salts, the sample was air dried at a temperature of 120° C., during a period of 12 hours, producing sample A1.

The preparation of sample A2 follows the procedure as sample A1. However, for sample A2, the amount of rare earth chlorides used in the preparation of sample A1 was doubled.

Example 2

In this example, the purpose was to test the multifunctional additive relative to the function of the metal trap.

Thus, from sample A, multifunctional additives A1 and A2 were prepared in accordance with Example 1.

In order to make a comparison, a sample of an inert material (R1), containing only 80% by weight of clay and 20% by weight of silica, and a sample of a commercial metal trap, (R2), containing a mixture of calcium and magnesium oxides, were also tested.

The samples were tested in the function of metal traps using the following procedure: 1 g of sample was mixed with 4 g of an FCC commercial catalyst, containing 20000 ppm of vanadium and ultra-stable zeolite having a sodium level lower than 3000 ppm. The mixture was then submitted to a severe deactivation with 100% steam at a temperature of 800° C. for 5 hours. During this treatment, the vanadium of the commercial catalyst was released and it attacked the structure of the ultra-stable zeolite. In order to measure the attack on the ultra stable zeolite structure, a determination was made regarding the reduction of the micro-porosity of the total mixture.

Table 3 shows the composition of the samples tested and the results of the micro-pore volume after deactivation.

TABLE 3

| Samples | R1 | A1 | A2 | R2 |
|---|---|---|---|---|
| Al$_2$O$_3$ (%) | 26.0 | 23.8 | 23.1 | 15.1 |
| Na$_2$O (%) | <0.05 | 0.16 | 0.16 | — |
| SiO$_2$ (%) | 63.0 | 59.0 | 57.2 | 41.1 |
| P$_2$O$_3$ (%) | 0.0 | 14.0 | 14.0 | 0.0 |
| RE$_2$O$_3$ (%) | 0.0 | 2.44 | 5.14 | 0.0 |
| CaO (%) | 0.0 | 0.0 | 0.0 | 23.0 |
| MgO (%) | 0.0 | 0.0 | 0.0 | 18.2 |
| Micro-pore volume of the mixture after deactivation (ml/g) | 0.027 | 0.048 | 0.044 | 0.075 |

It was observed that the additives prepared by the process here proposed preserved much more micro-pore volume than the inert material. Moreover, the samples were up to 50% more effective than the commercial metal trap referenced.

Example 3

In this example, the purpose was to test the multifunctional additive relative to the function of the additive to maximize the yield of light olefins and LPG.

Samples A1 and A2, prepared as described in Example 1, were submitted to a severe deactivation with 100% steam at 800° C. for 5 hours. Afterwards, the samples were mixed with an equilibrium catalyst (E-Cat) coming from an FCC unit, in the proportion of 96 parts E-Cat to 4 parts of sample, by weight. The properties of the E-Cat are summarized in Table 4.

TABLE 4

| Physical Properties | |
|---|---|
| BET SA (m$^2$/g) | 142 |
| MiPV (cm$^3$/g) | 0.053 |
| MSA (m$^2$/g) | 29.7 |
| Chemical Analysis | |
| SiO$_2$ (% p/p) | 55.3 |
| Al$_2$O$_3$ (% p/p) | 40.1 |
| RE$_2$O$_3$ (% p/p) | 2.48 |
| Na$_2$O (% p/p) | 0.53 |
| Fe$_2$O$_3$ (% p/p) | 0.46 |
| P$_2$O$_5$ (% p/p) | 0.60 |
| Ni (ppm) | 3579 |
| V (ppm) | 3074 |

So, the samples were evaluated in a catalytic cracking process in a fluidized bed with a stream having similar properties to those used in an industrial fluid catalytic cracking unit. For this evaluation, an ACE laboratory unite (manufactured by Kayser Technology) was used. The stream to be cracked presented the properties shown in Table 5.

TABLE 5

| °API | 18.3 |
|---|---|
| Density | 0.924 |
| Aniline Point (° C.) | 96.4 |
| Total Sulfur (% p/p) | 0.7 |
| Nitrogen Total (ppm) | 2800 |
| Basic Nitrogen (ppm) | 1000 |
| RCR (%) | 0.6 |

Table 6 shows the yield for the samples tested at 535° C. and catalyst/stream ratio equal to 5.

TABLE 6

| Samples | E-Cat | A1 | A2 | A |
|---|---|---|---|---|
| Conversion (%) | 64.9 | 67.2 | 64.8 | 63.6 |
| Yield normalized at 65% (% p/p) conversion | | | | |
| Combustible Gas | 2.50 | 3.07 | 2.67 | 2.88 |
| LPG | 13.9 | 21.6 | 17.8 | 18.5 |
| Propane | 4.11 | 8.03 | 6.33 | 6.87 |
| Gasoline | 43.8 | 35.3 | 39.8 | 38.7 |
| LCO | 18.1 | 16.0 | 17.8 | 18.8 |
| Beds | 17.1 | 15.7 | 17.5 | 18.5 |
| Coke | 4.81 | 5.08 | 4.76 | 4.89 |

From the conversion values shown in Table 6, it can be observed that none of the samples significantly affect overall activity of the catalytic system. Samples A1 and A2 increase the yield of LPG, mainly in the yield of propane. It is important to highlight that sample A, precursor of samples A1 and A2, achieves baseline yields close to commercial additives for maximizing the yield of light olefins and LPG.

The description made here of a multifunctional additive for the maximization of properties relevant to the fluid catalytic cracking process and the process for the preparation of these, which is the object of this invention, should be considered only as a possibility or possible embodiments, and any particular characteristics introduced herein should be understood only as something that was written to facilitate understanding. In this way, they should not in any way be considered as limitations of the invention, which is limited to the scope of the claims that follow.

The invention claimed is:

1. A multifunctional additive for maximizing the yield of light olefins and LPG in a fluidized catalytic cracking process, with tolerance to contaminant metals such as vanadium, wherein said additive is in the form of microspheres, comprising:
   a peptized alumina;
   a clay;
   a commercial colloidal silica or synthesized silica;
   a zeolite ZSM-5;
   phosphoric acid;
   a phosphate source; and
   rare earth salts, wherein the rear earth salts form a surface of the additive such that contaminant metals may contact the rare earth salts.

2. A multifunctional additive according to claim 1, wherein the rare earth salts are selected from the group consisting of: rare earth chlorides, rare earth nitrates, and mixtures thereof.

3. A process for the preparation of a multifunctional additive for maximizing the yield of light olefins and LPG and a tolerance to contaminant metals such as vanadium, in the form of microspheres, the process comprising the steps of:
   (a) preparing a precursor by mixing a peptized alumina, a clay, a commercial colloidal silica or a synthesized silica, a zeolite, and phosphoric acid;
   (b) spray-drying the precursor;
   (c) placing a phosphorous source on the precursor;
   (d) depositing rare earth salts on a surface of the precursor forming the multifunctional additive; and
   (e) drying the multifunctional additive formed at temperatures between 60° C. to 120° C.

4. A process for the preparation of a multifunctional additive, according to claim 3, wherein placing the phosphorous source on the precursor occurs through calcination at a temperature between 350° C. and 750° C.

5. A process for the preparation of a multifunctional additive according to claim 4, wherein placing the phosphorous source on the precursor occurs through calcination at a temperature between 450° C. and 500° C.

6. A process for the preparation of a multifunctional additive, according to claim 4, wherein the calcination occurs during the interval between 0.5 and 5 hours.

7. A process for the preparation of a multifunctional additive, according to claim 4, wherein the calcination occurs during an interval between 2 and 4 hours.

8. A process for the preparation of a multifunctional additive, according to claim 3, wherein drying the multifunctional additive occurs at a temperature between 100° C. and 120° C.

9. A process for the preparation of a multifunctional additive, according to claim 3, wherein depositing rare earth salts on the surface of the precursor occurs by adding a solution of ammonium hydroxide to the precursor at a concentration of between 1 and 8 mols.

10. A process for the preparation of a multifunctional additive, according to claim 9, wherein the solution of ammonium hydroxide has a pH between 7 and 11.

11. A process for the preparation of a multifunctional additive, according to claim 3, wherein depositing the rare earth salts occurs through hydrolysis.

12. A process for the preparation of a multifunction additive, according to claim 3, wherein placing the phosphorous source on the precursor occurs through washing with deionized water at a temperature between 60° C. and 100° C. with moderate agitation for a period between 0.5 and 5 hours.

13. A multifunctional additive, according to claim 1, wherein the rare earth salts are present in an amount in the range of 0.5 to 20 wt %.

14. A multifunctional additive, according to claim 1, wherein the rare earth salts are present in an amount in the range of 1.0 to 10 wt %.

15. A multifunctional additive, according to claim 1, wherein the rare earth salts are present in an amount in the range of 2.0 to 6.0 wt %.

* * * * *